US012159763B2

(12) United States Patent
Hohmann et al.

(10) Patent No.: US 12,159,763 B2
(45) Date of Patent: Dec. 3, 2024

(54) VACUUM SWITCHING DEVICE FOR A CIRCUIT HAVING A MAIN CURRENT PATH AND AN AUXILIARY CURRENT PATH

(71) Applicant: Siemens Aktiengesellschaft, Munich (DE)

(72) Inventors: Stefan Hohmann, Frankfurt am Main (DE); Martin Ratka, Friedrichsdorf (DE); Holger Schumann, Berlin (DE); Ulf Schuemann, Dallgow-Doeberitz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/773,142

(22) PCT Filed: Oct. 2, 2020

(86) PCT No.: PCT/EP2020/077631
§ 371 (c)(1),
(2) Date: Apr. 29, 2022

(87) PCT Pub. No.: WO2021/083609
PCT Pub. Date: May 6, 2021

(65) Prior Publication Data

US 2024/0186087 A1 Jun. 6, 2024

(30) Foreign Application Priority Data

Oct. 29, 2019 (DE) ..................... 10 2019 216 663.6

(51) Int. Cl.
*H01H 33/662* (2006.01)
*H01H 33/664* (2006.01)
*H01H 33/666* (2006.01)

(52) U.S. Cl.
CPC .... *H01H 33/66261* (2013.01); *H01H 33/664* (2013.01); *H01H 33/6661* (2013.01)

(58) Field of Classification Search
CPC ........... H01H 33/664; H01H 33/66261; H01H 33/6661; H01H 33/6662; H01H 33/143;
(Continued)

(56) References Cited

U.S. PATENT DOCUMENTS 2,981,813 A 4/1961 Jennings
4,746,777 A * 5/1988 Bialkowski ...... H01H 33/66261 218/136
(Continued)

FOREIGN PATENT DOCUMENTS

CN 1183850 A 6/1998
CN 1664970 A 9/2005
(Continued)

*Primary Examiner* — William A Bolton
(74) *Attorney, Agent, or Firm* — Laurence A. Greenberg; Werner H. Stemer; Ralph E. Locher

(57) ABSTRACT

A vacuum switch device has a housing body, a stationary electrical contact and a moving electrical contact, which is arranged within the housing body. With a movement of the moving contact towards the stationary contact, the contacts form an electrical contact. With a movement away the electrical contact is interrupted. A sliding bearing provides sliding support for the moving contact for its movement towards and away from the stationary contact. The sliding bearing has an electrically conductive material and at least partially electrically insulates the housing body. A spring element is supported on a spring support and presses the moving electrical contact in the direction of the stationary electrical contact. There is also provided a circuit with a main current path and a parallel auxiliary current path. The vacuum switch device is arranged in the auxiliary current path.

12 Claims, 5 Drawing Sheets

(58) Field of Classification Search
CPC .... H01H 33/12; H01H 33/121; H01H 33/125; H01H 33/126; H01H 2033/66253; H01H 1/50; H01H 1/502
USPC .......................... 218/139, 134, 135, 136, 118
See application file for complete search history.

(56) References Cited

U.S. PATENT DOCUMENTS

| | | | | |
|---|---|---|---|---|
| 5,168,139 | A | 12/1992 | Bettge et al. | |
| 5,313,030 | A * | 5/1994 | Kusserow | H01H 33/6642 218/136 |
| 5,543,598 | A * | 8/1996 | Duffour | H01H 33/66238 218/138 |
| 5,847,347 | A | 12/1998 | Schwarze et al. | |
| 7,115,831 | B2 * | 10/2006 | Chyla | H01H 33/6606 218/124 |
| 7,563,161 | B2 * | 7/2009 | Perret | H01H 33/6661 218/140 |
| 8,680,956 | B2 * | 3/2014 | Kim | H01F 7/1615 335/179 |
| 9,058,948 | B2 | 6/2015 | Grosjean | |
| 9,659,729 | B2 * | 5/2017 | Bartz | H01H 33/66207 |
| 2002/0153353 | A1 * | 10/2002 | Inagaki | H01H 3/001 218/118 |
| 2005/0194359 | A1 | 9/2005 | Masnada et al. | |

FOREIGN PATENT DOCUMENTS

| | | | |
|---|---|---|---|
| CN | 103594280 | A | 2/2014 |
| CN | 106531542 | A | 3/2017 |
| CN | 108321004 | A | 7/2018 |
| DE | 102018109750 | A1 | 10/2019 |
| EP | 2479769 | A1 | 7/2012 |
| EP | 2482301 | A1 | 8/2012 |
| EP | 3109878 | A1 | 12/2016 |
| GB | 1206297 | A | 9/1970 |
| JP | S4312016 | Y1 | 5/1968 |
| WO | 9003657 | A1 | 4/1990 |

* cited by examiner

VACUUM SWITCHING DEVICE FOR A CIRCUIT HAVING A MAIN CURRENT PATH AND AN AUXILIARY CURRENT PATH

SPECIFICATION

FIELD AND BACKGROUND OF THE INVENTION

The present invention relates to a vacuum switching device, in particular a vacuum switching tube, and to a circuit having a main current path and an auxiliary current path in parallel therewith, wherein a vacuum switching device is arranged in the auxiliary current path.

FIG. 9 shows a conventional vacuum switching device in the form of a vacuum switching tube. The conventional vacuum switching device has a housing body that comprises an electrically insulating material, such as for example a ceramic tube, a spatially fixed electrical contact, which is arranged in a spatially fixed manner in relation to the housing body and within the housing body, and a movable electrical contact, which is arranged in a movable manner in relation to the housing body and within the housing body such that, when it is moved toward the spatially fixed electrical contact, it establishes electrical contact therewith and, when it is moved away from the spatially fixed electrical contact, it interrupts the electrical contact.

Vacuum switching tubes have to meet application-specific technical requirements during operation, in particular including with regard to external dielectric strength. A metallization edge or weld edge is present at the axial end of the ceramic tube due to the manufacturing process and is a potential weak spot for the external dielectric strength U. In order to meet the requirements in terms of external dielectric strength in the usage environment, it is possible to use various design features on the tube (including installation situation) or insulation options (gas, oil, silicone, etc.). On the one hand, it is possible to generate sufficient dielectric strength through sufficient dimensioning of the ceramic length in air or through gaseous insulating media such as SF6 (or other technical gases, including at above atmospheric pressure). Other conventional measures comprise siliconizing entire tubes or partially insulating the metallization edge, for example using potting tape.

A further requirement on the tube is a sufficient contact pressing force between the spatially fixed electrical contact and the movable electrical contact. The current-carrying contacts of the vacuum switching device are kept closed by external forces. These forces consist of the closing force generated by the pressure difference between the inside and the outside and additional, externally introduced closing forces, which are often provided by springs (bellows and spring). The forces prevent the contacts from lifting off in the event of high currents and reduce the internal resistance of the current path. In particular in the case of applications in which it is necessary to manage only small currents, only small contact pressing forces are required due to the quadratic dependency with respect to current. If the inherent closing force of the tube itself is relatively small and additionally fluctuates due to component tolerances, defined relationships are created by forces that are additionally externally applied. The contact forces for vacuum switching tubes are usually generated outside the tube in appropriate spring assemblies.

SUMMARY OF THE INVENTION

There is a need for a vacuum switching device that achieves the abovementioned requirements of a sufficient external dielectric strength and a sufficient contact pressing force through a simplified structure and that is able to be integrated in an auxiliary current path. This need is able to be met by the subjects of the independent claims. The present invention is developed further in accordance with the dependent claims.

According to a first aspect of the invention, a vacuum switching device has a housing body that comprises an electrically insulating material, a spatially fixed electrical contact, which is arranged in a spatially fixed manner in relation to the housing body and within the housing body, a movable electrical contact, which is arranged in a movable manner in relation to the housing body and within the housing body such that, when it is moved toward the spatially fixed electrical contact, it establishes electrical contact therewith and, when it is moved away from the spatially fixed electrical contact, it interrupts the electrical contact, and a sliding bearing that is connected to the housing body and supports the movable electrical contact in a sliding manner for the movement thereof toward and away from the spatially fixed electrical contact. The sliding bearing comprises an electrically conductive material and at least partially dielectrically shields the housing body. The sliding bearing has a spring support that supports a spring element that presses the movable electrical contact in the direction toward the spatially fixed electrical contact.

According to the present invention, the sliding bearing takes on a multiplicity of functions, specifically not only the sliding mounting of the movable electrical contact, but also the function of dielectrically de-energizing the metallization edge and the counter-mounting of the spring element (for example integrated in a bellows space) for the buildup of the contact force. A large number of functions are thus already integrated in the assembly consisting of the sliding bearing and the spring element.

According to one exemplary embodiment, the housing body, on one of its axial ends, has a flange that comprises an electrically conductive material, wherein the sliding bearing at least partially electrically shields the flange. The sliding bearing made from electrically conductive material, by virtue of its geometric shape (optionally interacting with the flange), additionally takes on the function of dielectrically de-energizing the metallization edge by virtue of the electrical field, in the region of the metallization edge, being homogenized such that the dielectric strength is able to be increased there.

According to one exemplary embodiment, the movable electrical contact has a contact section and an axial shaft section connected thereto, and the spring element is seated coaxially on the shaft section and pretensioned between the spring support of the sliding bearing and a further spring support of the movable electrical contact. This achieves a particularly compact structural form.

According to one exemplary embodiment, the sliding bearing has a tubular sliding section that is seated so as to slide coaxially on the shaft section of the movable electrical contact, and a shielding section that extends radially externally from the sliding section and at least partially electrically shields the flange of the housing body along with the weld edge. This likewise achieves a particularly compact structural form.

According to one exemplary embodiment, the sliding bearing is attached to the housing body by way of a bayonet connection, a snap-in connection, an adhesive bond or a thread. According to one exemplary embodiment, the bayonet connection, the snap-in connection, the adhesive bond or the thread is provided on the sliding section of the sliding bearing. The mounting and fastening of the sliding bearing on/in the housing body are simplified through the integrated bayonet principle and/or by the snap-in connection, an adhesive bond, and/or the thread.

According to one exemplary embodiment, the shielding section of the sliding bearing may have at least one slot extending in a spiral shape. The shielding section thereby gains a sprung design that additionally serves to mount and center the sliding bearing with respect to an external device.

According to one exemplary embodiment, the shielding section of the sliding bearing is inclined axially toward the housing body. According to one exemplary embodiment, the shielding section is arranged on an axial end of the sliding section. This achieves a compact structural form and at the same time effective dielectric de-energization.

According to one exemplary embodiment, the shielding section of the sliding bearing has a stop that is intended to center the sliding bearing in its installed state and to axially support it. A further function is thereby integrated in the sliding bearing, specifically that of receiving and centering the sliding bearing and/or the housing body in the vacuum switching device.

According to one exemplary embodiment, the shielding section is elastically deformable in the axial direction (for example by the slot extending in a spiral shape). The sprung design of the shielding section firstly allows mounting in an undercut and secondly ensures that the external shielding section always bears on the weld edge and reliably de-energizes same. The counterforce of the spring element is forwarded, via the sliding bearing, to the shielding section of the sliding bearing and is transferred from there to an external receiving body.

According to one exemplary embodiment, the vacuum switching device furthermore has a bellows that is arranged coaxially above the spring element and coaxially above the tubular sliding section of the sliding bearing and is connected to the movable electrical contact, on the one hand, and to the housing body, on the other hand.

According to one exemplary embodiment, the vacuum switching device is a vacuum switching tube.

According to one exemplary embodiment, the shaft section of the movable electrical contact protrudes axially beyond the sliding bearing and, on its axial end, has a coupling section to which an external actuation element, such as for example a rocker, is able to be coupled in order to move the movable electrical contact toward the spatially fixed electrical contact or away therefrom.

According to a second aspect of the invention, provision is made for a circuit having a main current path and an auxiliary current path in parallel therewith, wherein a vacuum switching device is arranged in the auxiliary current path and comprises the following: a housing body that comprises an electrically insulating material; a spatially fixed electrical contact that is arranged in a spatially fixed manner in relation to the housing body and within the housing body; a movable electrical contact that is arranged in a movable manner in relation to the housing body and within the housing body such that, when it is moved toward the spatially fixed electrical contact, it establishes electrical contact therewith and, when it is moved away from the spatially fixed electrical contact, it interrupts the electrical contact; and a spring element that presses the movable electrical contact in the direction toward the spatially fixed electrical contact. According to one exemplary embodiment, the vacuum switching device has a bellows that is arranged coaxially around the spring element or is formed by the spring element.

The vacuum switching device is preferably an embodiment of the first aspect of the invention as described above.

At least one of the following features is preferably achieved: a lift of the movable electrical contact is 4 to 20 mm, preferably 6 to 10 mm; a load deactivation current in the auxiliary current path is less than 1250 A, preferably 630 A±30 A; a current flow duration during a deactivation process of the vacuum switching device is 1 to 20 ms; the circuit is used in a voltage range that is greater than or equal to 1 kV, preferably in a range between 1 kV and 52 kV inclusive; a takeover current in the case of a load circuit breaker/fuse combination in the auxiliary current path is less than 2500 A; a spring constant of the spring element is in a range between 1 and 15 N/mm inclusive.

The conventional vacuum tubes used hitherto in switchgear were always used in circuit breakers in the main current path. One important and demanding requirement for vacuum tubes in this conventional application case was the ability to carry short-circuit currents. In this case, comparatively very high forces act and necessitate correspondingly large and strong springs. Owing to the size of the springs, it was not possible to position the springs in the bellows.

The present invention uses a vacuum switching device to be inserted in an auxiliary current path or bypass. The requirement for the ability to carry short-circuit currents is dispensed with here. The spring element that is used serves as a mechanical support. This is comparatively weak and compact. The spring element may thereby be arranged within a bellows for use in a vacuum switching tube.

BRIEF DESCRIPTION OF THE FIGURES

The aspects defined above and further aspects of the present invention will become apparent from the exemplary embodiments described below. In order to be able to be implemented, the invention is described in more detail below with reference to the exemplary embodiments, but the invention is not restricted to these.

DETAILED DESCRIPTION OF THE INVENTION

The drawings are illustrated schematically. It is pointed out that similar or identical elements are provided with the same reference signs in various figures.

Figure 1:
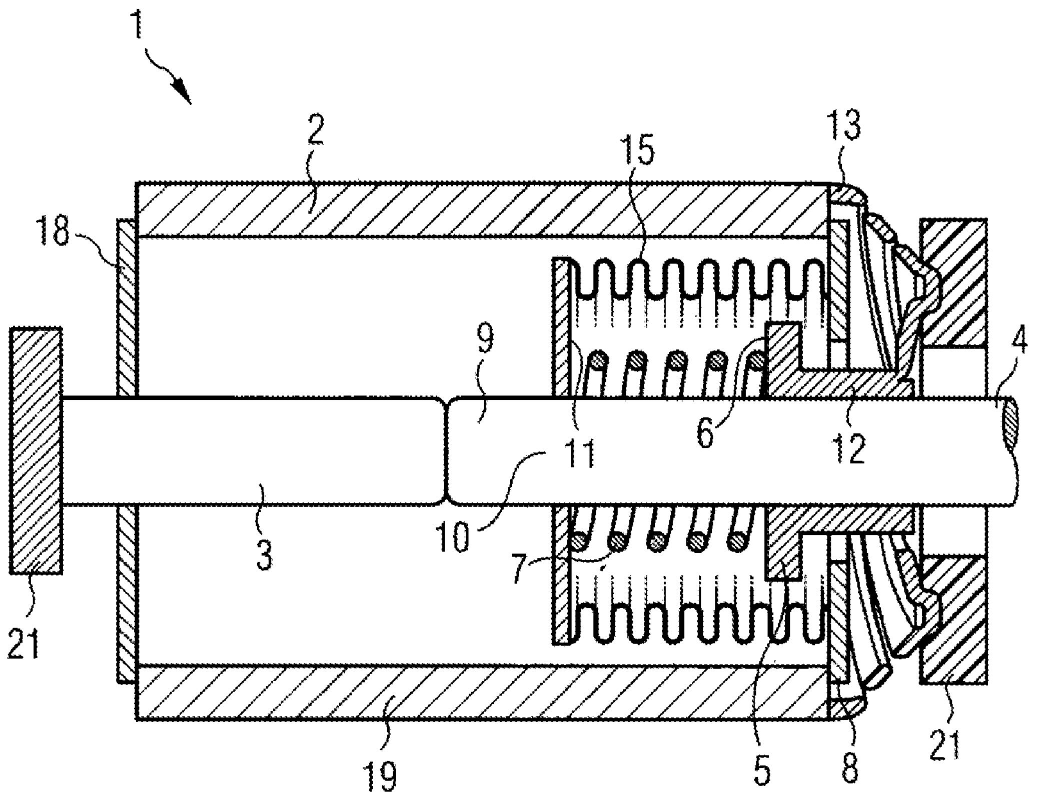
FIG. 1 shows a longitudinal section through a vacuum switching device according to one exemplary embodiment of the present invention.

FIG. 1 shows a longitudinal section through a vacuum switching device 1 according to one exemplary embodiment of the present invention. The vacuum switching device 1 is a vacuum switching tube and has a cylindrical housing body 2 that comprises an electrically insulating material or is formed from an electrically insulating material. The electrically insulating material may be a ceramic. The electrically insulating material may be formed by a tube, in particular by a cylindrical ceramic tube 19 as in the illustrated exemplary embodiment. Arranged within the housing body 2 are a spatially fixed electrical contact 3, which is arranged in a spatially fixed manner in relation to the housing body 2, and a movable electrical contact 4, which is arranged in a movable manner in relation to the housing body such that, when it is moved toward the spatially fixed electrical contact 3, it establishes electrical contact therewith and, when it is moved away from the spatially fixed electrical contact 3, it interrupts the electrical contact.

The vacuum switching device 1 furthermore has a sliding bearing 5 that is connected to the housing body 2 and supports the movable electrical contact 4 in a sliding manner for the movement thereof toward and away from the spatially fixed electrical contact 3. The sliding bearing 5 comprises an electrically conductive material or it is formed from an electrically conductive material, and it at least partially electrically shields the housing body 2. A spring support 6 is provided on the sliding bearing 5 and supports a spring element 7 in the form of a compression spring that presses the movable electrical contact 4 in the direction toward the spatially fixed electrical contact 3. The spring element 7 is seated coaxially on the shaft section 10 and pretensioned between the spring support 6 of the sliding bearing 5 and a further spring support 11 of the movable electrical contact 4.

The movable electrical contact 4 has a contact section 9 and an axial shaft section 10 connected thereto.

The housing body 2, on one of its axial ends (on the right-hand end in FIG. 1), has a flange 8 that comprises an electrically conductive material or that is formed from an electrically conductive material, wherein the sliding bearing at least partially electrically shields the flange 8. The housing body 2 furthermore has, on its other axial end (on the left-hand end in FIG. 1), a further flange 18 that comprises an electrically conductive material or that is formed from an electrically conductive material. In the illustrated exemplary embodiment, the housing body 2 is accordingly formed by the cylindrical ceramic tube 19, the flange 8 and the further flange 18.

The shaft section 10 of the movable electrical contact 4 protrudes axially beyond the sliding bearing 5 and, on its axial end, has a coupling section 16 to which an external actuation element, such as for example a rocker, is able to be coupled in order to move the movable electrical contact 4 toward the spatially fixed electrical contact 3 or away therefrom.

The sliding bearing 5 has a tubular sliding section 12 that is seated so as to slide coaxially on the shaft section 10 of the movable electrical contact 4, and a shielding section 13 that extends radially externally from the sliding section 12 and at least partially electrically shields the flange 8 of the housing body 2.

A weld edge or a metallization edge of the housing body 2 is present in the interface between the ceramic tube 19 and the flange 8 and is usually a weak spot in relation to the dielectric strength or the external dielectric strength. The sliding bearing 5 and in particular its shielding section 13 however in the present invention ensure dielectric de-energization or smoothing of the electric field in the region of the metallization edge, meaning that the dielectric strength is able to be improved significantly there.

The vacuum switching device 1 furthermore has a bellows 15 that is arranged coaxially above the spring element 7 and coaxially above the tubular sliding section 12 of the sliding bearing 5 and is connected to the movable electrical contact 4, on the one hand, and the housing body 2 (that is to say the flange 8), on the other hand. This achieves a particularly compact structural form. The bellows 15 is protected by a pot-shaped shield 17 arranged on the movable electrical contact 4.

The spring element 7 does not necessarily have to be designed as a separate compression spring. In one embodiment, the bellows 15 may additionally take on the function and property of the spring element 7. In another embodiment, the spring element 7 and the sliding bearing 5 may be formed in one piece, wherein the spring support 6 may be implemented for example by a materially bonded, form-fitting or frictional coupling between the spring element 7 and the sliding bearing 5.

The shielding section 13 of the sliding bearing 5 is arranged on an axial end of the sliding section 12, and it is inclined axially toward the housing body 2. A multiplicity of slots 14 extending in a spiral shape are formed in the shielding section 13 of the sliding bearing 5, meaning that the shielding section 13 is able to be elastically deformed in the axial and radial direction.

Figure 2:
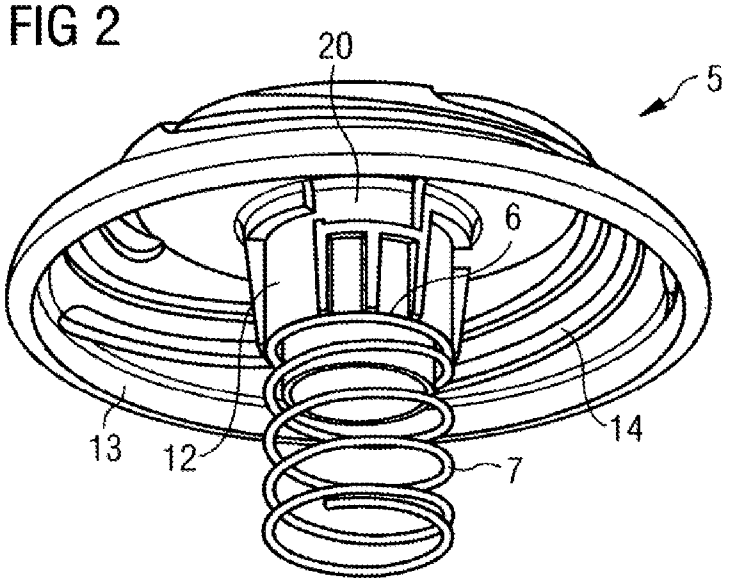
FIG. 2 shows a perspective view of an assembly consisting of a sliding bearing and a spring element according to the exemplary embodiment.

FIG. 2 shows a perspective view of an assembly consisting of the sliding bearing 5 and the spring element 7 according to the exemplary embodiment. FIG. 2 in particular shows the spring support 6 for the spring element 7, the sliding section 12, the shielding section 13 and the multiplicity of slots 14 in the shielding section 13 of the sliding bearing 5. FIG. 2 furthermore shows a bayonet connection 20 by way of which the sliding bearing 5 is attached to the housing body 2. The bayonet connection 20 is formed on an outer side surface of the sliding section 12 and engages with an internal contour of the flange 8 of complementary design. In this case, the sliding section 12 of the sliding bearing 5 is introduced into a central passage opening in the flange 8, and the bayonet connection 20 engages or the bayonet connection 20 locks by virtue of the sliding bearing 5 being rotated.

Figure 3:
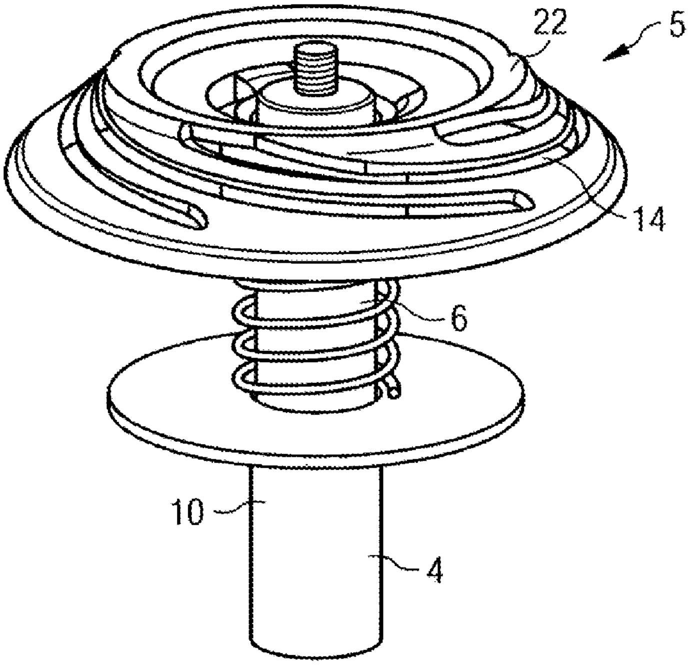
FIG. 3 shows a perspective view of an assembly consisting of the sliding bearing, the spring element, a movable electrical contact and a shield according to the exemplary embodiment.

FIG. 3 shows a perspective view of an assembly consisting of the sliding bearing 5, the spring element 7, the movable electrical contact 4, which comprises the contact section 9 and the shaft section 10, and the shield 17 according to the exemplary embodiment. The slots 14 in the shielding section 13 of the sliding bearing 5 are likewise shown.

Figure 4:
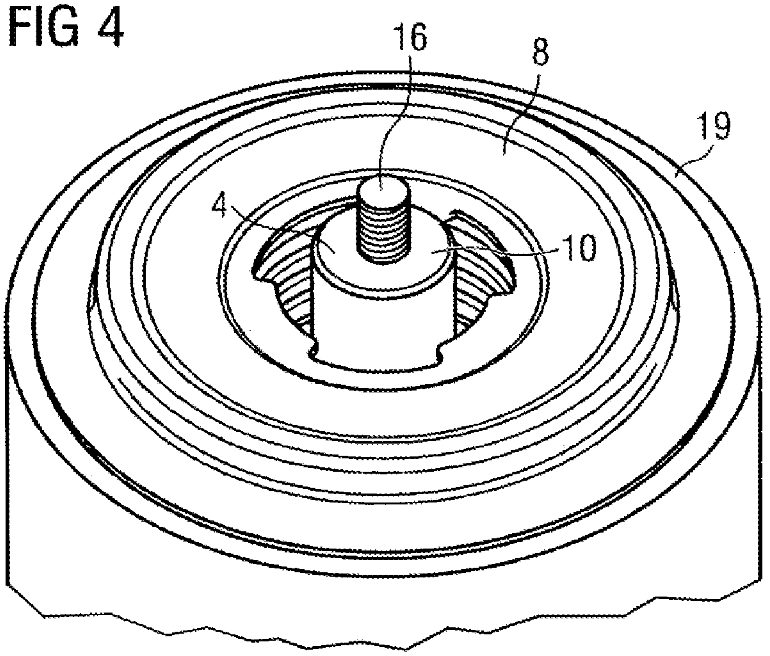
FIG. 4 shows a perspective view of an assembly consisting of a ceramic tube, a flange and the movable electrical contact.

FIG. 4 shows a perspective view of an assembly consisting of the ceramic tube 19, the flange 8 and the movable electrical contact 4. The shaft section 10 of the movable electrical contact 4 protrudes axially beyond the sliding bearing 5 (not shown in FIG. 4), which is located behind the flange 8, and, on its axial end, comprises the coupling section 16, to which the external actuation element, such as for example the rocker, is able to be coupled in order to move the movable electrical contact 4 toward the spatially fixed electrical contact 3 or away therefrom.

Figure 5:
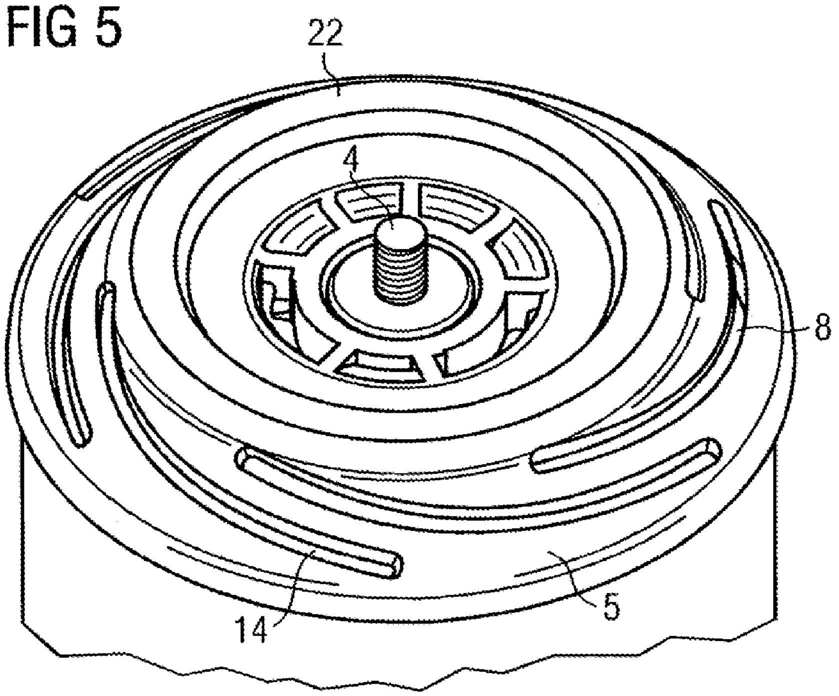
FIG. 5 shows a perspective view of an assembly consisting of the flange, the movable electrical contact and the sliding bearing.

FIG. 5 shows a perspective view of an assembly consisting of the flange 8 located behind the sliding bearing 5, the movable electrical contact 4 and the sliding bearing 5. In comparison with FIG. 4, FIG. 5 shows the state in which the sliding bearing 5 is arranged above the flange 8.

Figure 6:
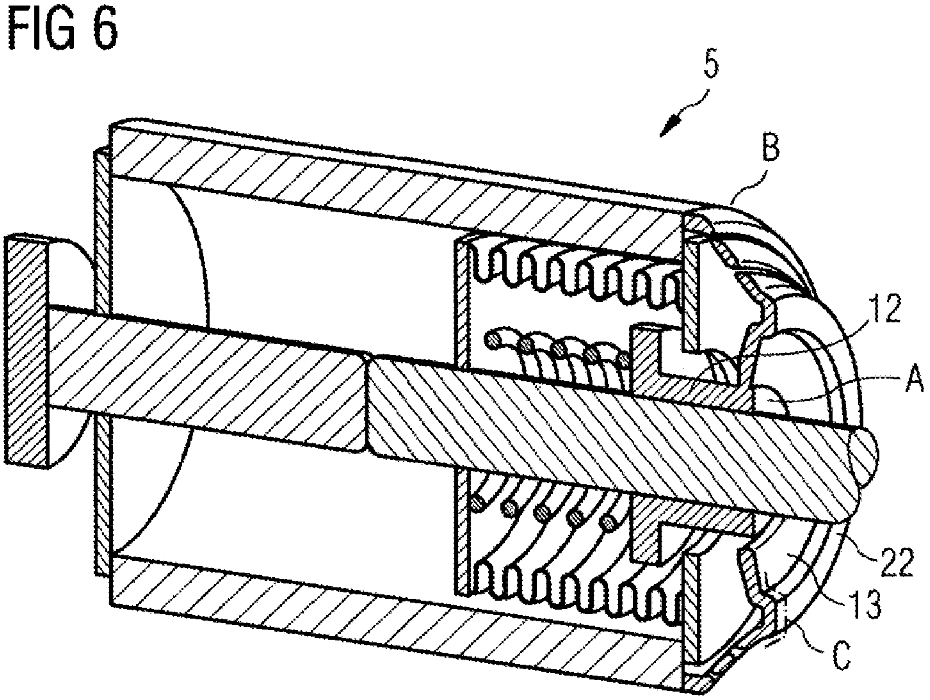
FIG. 6 shows a perspective longitudinal section through the vacuum switching device according to the exemplary embodiment of the present invention.
Figure 7:
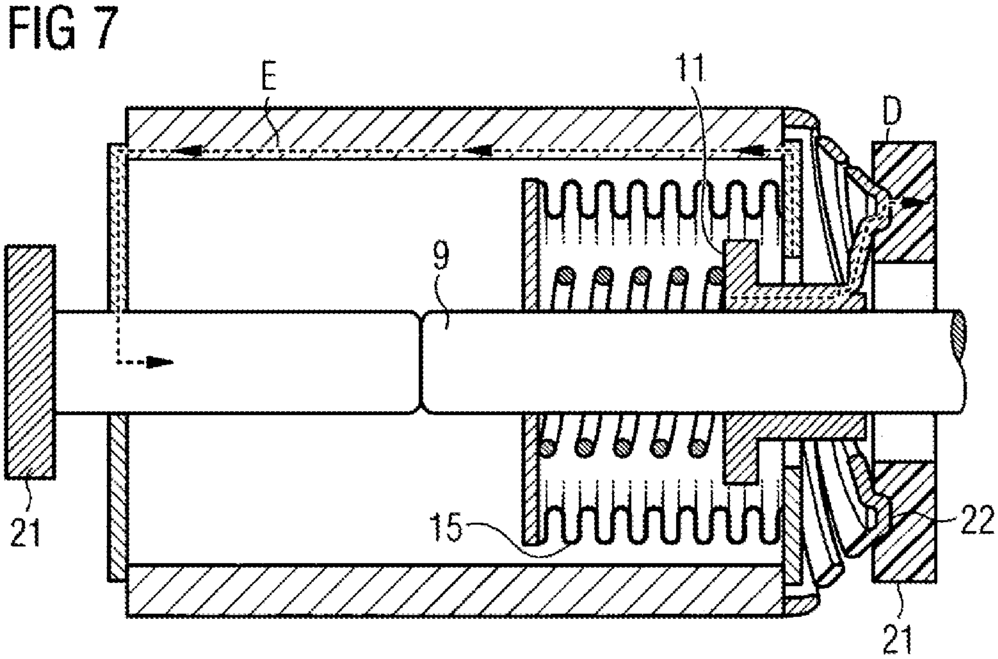
FIG. 7 shows a longitudinal section through the vacuum switching device according to the exemplary embodiment of the present invention.

FIGS. 6 and 7 each show perspective longitudinal sections through the vacuum switching device 1 according to the exemplary embodiment of the present invention. The various components and functions of the sliding bearing 5 are indicated once again. The reference sign A denotes the bearing function for the sliding mounting of the movable electrical contact 4 by the sliding section 12 of the sliding bearing 5. The reference sign B denotes the function of the sliding bearing 5 for the dielectric de-energization or smoothing of the electric field by way of the shielding section 13 that shields the metallization edge or weld edge of the housing body 2.

The reference sign C denotes the function, already addressed above, of centering the sliding bearing 5. The centering is achieved by a stop 22. The stop 22 is formed by a raised, ring-shaped contour of the shielding section 13 and engages in a complementary recess of an external receiving body 21 in accordance with the tongue-and-groove principle.

FIG. 7 furthermore illustrates force flows. The arrow denoted by the reference sign D indicates the force flow of the spring force of the spring element 7 between the stop 22 and the further spring support 11 formed on the movable electrical contact 4. The arrow denoted by the reference sign E indicates the force flow of a force between the flange 8 and the contact section 9. This force consists of a bellows force applied by the bellows 15 and an externally applied gas pressure differential force.

Figure 8:
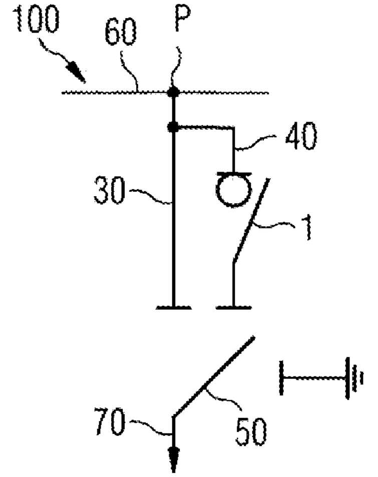
FIG. 8 shows an equivalent circuit diagram of a circuit having a main current path and an auxiliary current path in parallel therewith, wherein a vacuum switching device is arranged in the auxiliary current path.
Figure 9:
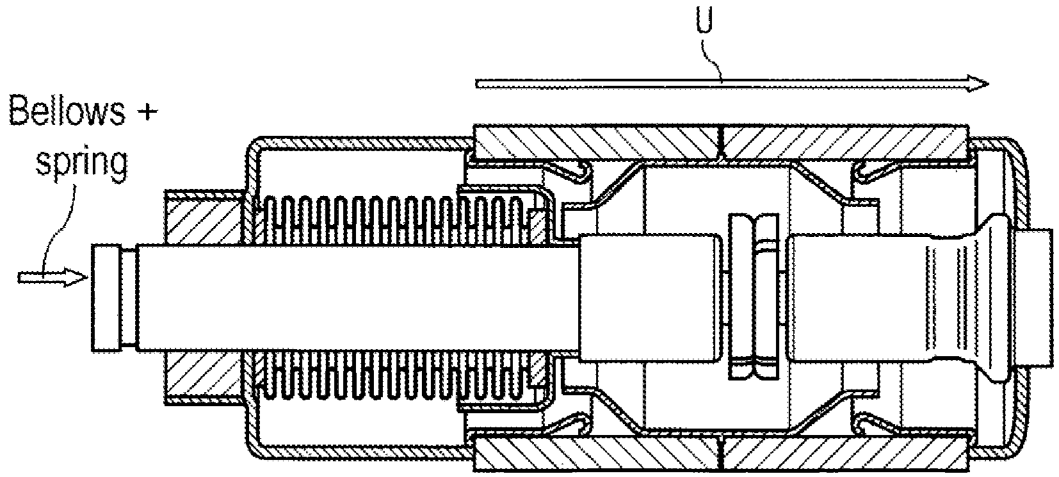
FIG 9 Prior art
FIG. 9 shows a conventional vacuum switching device.

FIG. 8 shows an equivalent circuit diagram of a circuit 100 having a main current path 30 and an auxiliary current path 40 in parallel therewith, wherein a vacuum switching device 1 is arranged in the auxiliary current path 40. The main current path 30 and the auxiliary current path 40 each have, at one end, a common node point P that is connected to a first line 60. The respective other ends of the main current path 30 and of the auxiliary current path 40 are able to be connected selectively to a second line 70 via a switching device 50.

The vacuum switching device 1 shown in FIG. 1 may preferably, but not necessarily, be arranged in the auxiliary current path. Such a vacuum switching device 1 has a housing body 2 that comprises an electrically insulating material, a spatially fixed electrical contact 3, which is arranged in a spatially fixed manner in relation to the housing body 2 and within the housing body 2, a movable electrical contact 4, which is arranged in a movable manner in relation to the housing body 2 and within the housing body 2 such that, when it is moved toward the spatially fixed electrical contact 3, it establishes electrical contact therewith and, when it is moved away from the spatially fixed electrical contact 3, it interrupts the electrical contact, and a spring element 7 that presses the movable electrical contact 4 in the direction toward the spatially fixed electrical contact 3.

The spring element 7 is preferably embodied as a compression spring. The vacuum switching device 1 may have a bellows 15 that is arranged coaxially around the spring element 7. As an alternative, the bellows may be formed by the spring element 7 itself.

At least one of the following features is preferably achieved: a lift of the movable electrical contact 4 is 4 to 20 mm, preferably 6 to 10 mm; a load deactivation current in the auxiliary current path 40 is less than 1250 A, preferably 630 A±30 A; a current flow duration during a deactivation process of the vacuum switching device 1 is 1 to 20 ms; the circuit 100 is used in a voltage range that is greater than or equal to 1 kV, preferably in a range between 1 kV and 52 kV inclusive; a spring constant of the spring element is in a range between 1 and 15 N/mm inclusive; a takeover current in the case of a load circuit breaker/fuse combination in the auxiliary current path 40 is less than 2500 A. A fuse (not shown), such as for example a thermal fuse, may be arranged 29 in series with the vacuum switching device 1 in the second line 70 in the case of the load circuit breaker/fuse combination. The fuse may be arranged at the output of the vacuum switching device 1. The fuse may in turn for example be connected to a transformer that is connected at the output of the second line 70.

It should be borne in mind that the term “comprise” or “have” does not rule out other elements or steps. Elements that are described in connection with various embodiments may also be combined. It is also pointed out that reference signs in the claims should not be interpreted to mean that they reflect the scope of the claims.

LIST OF REFERENCE SIGNS

1 vacuum switching device
2 housing body
3 spatially fixed electrical contact
4 movable electrical contact
5 sliding bearing
6 spring support
7 spring element
8 flange
9 contact section
10 shaft section
11 further spring support
12 sliding section
13 shielding section
14 slot
15 bellows
16 coupling section
17 shield
18 further flange
19 ceramic tube
20 bayonet connection
21 external receiving body
22 stop
30 main current path
40 auxiliary current path
50 switching device
60 first line
70 second line
100 circuit

The invention claimed is:

1. A vacuum switching device, comprising:

a housing body formed with an electrically insulating material;

a stationary electrical contact, which is spatially fixed relative to said housing body and within said housing body;

a movable electrical contact, which is movably arranged relative to said housing body and within said housing body, wherein, when said movable electrical contact is moved toward said stationary electrical contact, an electrical contact is established between said stationary and movable electrical contacts and, when said movable electrical contact is moved away from said stationary electrical contact, the electrical contact is interrupted; and a sliding bearing connected to said housing body and supporting said movable electrical contact for a sliding movement toward and away from said stationary electrical contact;

said sliding bearing having an electrically conductive material and being configured to at least partially electrically shield said housing body; and said sliding bearing having a spring support configured to support a spring element disposed to press said movable electrical contact in a direction toward said stationary electrical contact;

said movable electrical contact having a contact section, an axial shaft section connected thereto, and a shaft spring support;

said spring element being seated coaxially on said shaft section and being pretensioned between said spring support of said sliding bearing and said shaft spring support of said movable electrical contact;

said sliding bearing having a tubular sliding section that is seated so as to slide coaxially on said shaft section of said movable electrical contact, and a shielding section that extends radially externally from said sliding section and at least partially electrically shields said flange of said housing body; and said shielding section of said sliding bearing being formed with at least one slot extending in a spiral shape.

2. The vacuum switching device according to claim 1, wherein said housing body has an axial end with a flange that comprises an electrically conductive material and said sliding bearing at least partially electrically shields said flange.

3. The vacuum switching device according to claim 1, wherein said sliding bearing is attached to said housing body by way of a connection selected from the group consisting of a bayonet connection, a snap-in connection, an adhesive bond, and a thread.

4. The vacuum switching device according to claim 1, wherein said sliding bearing is attached to said housing body by way of a connection selected from the group consisting of a bayonet connection, a snap-in connection, an adhesive bond, and a thread provided on said sliding section of said sliding bearing.

5. The vacuum switching device according to claim 1, wherein said shielding section of said sliding bearing is inclined axially toward said housing body.

6. The vacuum switching device according to claim 1, wherein said shielding section is arranged on an axial end of said sliding section.

7. The vacuum switching device according to claim 1, wherein said shielding section of said sliding bearing has a stop that is configured so as to center said sliding bearing in an installed state thereof.

8. The vacuum switching device according to claim 1, wherein said shielding section is elastically deformable in an axial direction thereof.

9. The vacuum switching device according to claim 1, further comprising a bellows arranged coaxially around said spring element and coaxially around said tubular sliding section of said sliding bearing, and wherein said bellows is connected between said movable electrical contact and said housing body.

10. The vacuum switching device according to claim 1 configured as a vacuum switching tube.

11. The vacuum switching device according to claim 1, wherein said movable electrical contact has a shaft section that protrudes axially beyond said sliding bearing and an axial end with a coupling section, and wherein said coupling section is configured for connecting an external actuation element for moving said movable electrical contact toward and away from said stationary electrical contact.

12. A vacuum switching device, comprising:

a housing body formed with an electrically insulating material;

a stationary electrical contact, which is spatially fixed relative to said housing body and within said housing body;

a movable electrical contact, which is movably arranged relative to said housing body and within said housing body, wherein, when said movable electrical contact is moved toward said stationary electrical contact, an electrical contact is established between said stationary and movable electrical contacts and, when said movable electrical contact is moved away from said stationary electrical contact, the electrical contact is interrupted; and a sliding bearing connected to said housing body and supporting said movable electrical contact for a sliding movement toward and away from said stationary electrical contact;

said sliding bearing having an electrically conductive material and being configured to at least partially electrically shield said housing body;

said sliding bearing having a spring support configured to support a spring element disposed to press said movable electrical contact in a direction toward said stationary electrical contact;

said movable electrical contact having a contact section, an axial shaft section connected thereto, and a shaft spring support;

said spring element being seated coaxially on said shaft section and being pretensioned between said spring support of said sliding bearing and said shaft spring support of said movable electrical contact;

said sliding bearing having a tubular sliding section that is seated so as to slide coaxially on said shaft section of said movable electrical contact, and a shielding section that extends radially externally from said sliding section and at least partially electrically shields said flange of said housing body; and said shielding section being elastically deformable in an axial direction thereof.

* * * * *